United States Patent Office 3,192,187
Patented June 29, 1965

3,192,187
PREPARATION OF STRETCHABLE POLYURETHANE CASTINGS USING A COCATALYST SYSTEM OF AN EPOXY ALKANE AND A BICYCLIC AMINE
Burton D. Beitchman, Springfield Township, Pa., and William E. Erner, Wilmington, Del., assignors to Air Products and Chemicals, Inc., a corporation of Delaware
No Drawing. Filed Dec. 28, 1961, Ser. No. 162,966
6 Claims. (Cl. 260—77.5)

This application is a continuation-in-part of application of Burton D. Beitchman and William E. Erner, Serial No. 83,150, filed January 17, 1961.

This invention relates to the preparation of polyurethane articles by casting of compositions which can be cured and stabilized at a temperature above room temperature to provide an advantageous combination of elasticity and tensile strength.

Heretofore, there have been various proposals relating to the casting of polyurethane elastomers. For example, there have been suggestions that viscous resins of polyesters be admixed with aliphatic diisocyanates to prepare a reaction mixture having a sufficiently low viscosity to be pourable into a mold, using a very prolonged heat treatment to cure and stabilize the cast article. The physical properties readily attainable from previous casting formulations have been sufficiently remote from the commercial requirements for articles made from stretchable polyurethane that a high proportion of such items have been made by procedures involving a greater number of manufacturing operations than required by the simpler casting method.

Heretofore, triethylenediamine has been employed as a catalyst for polyurethane formation as explained in Orchin 2,939,851. Methyl substituted derivatives of triethylenediamine also catalyze polyurethane formation, as explained in the application of Farkas et al., Serial No. 136,750, filed September 8, 1961.

Said parent application Serial No. 83,150 describes the effectiveness of the combination of a $C_2$–$C_5$ epoxide and triethylenediamine as cocatalysts for polyurethane formation, this case being particularly concerned with elastomers, elastomer-like materials; compositions for preparing elastomer-like materials and methods for making articles by casting such compositions.

The term "stretachable composition" as used herein is intended to embrace both elastomers (generally defined as capable of returning to approximately original dimensions after elongation and elongatable at least 100% prior to rupture in tensile strength testing apparatus) and resilient compositions having less than 100% elongation but useful for articles oftentimes prepared from elastomers, such as bearings, and gears.

In accordance with the present invention, stretchable articles are prepared by casting a polyurethane reaction mixture containing as catalytic components the combination of a $C_2$–$C_5$ epoxy alkane and a compound of the formula

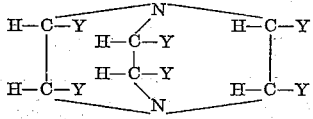

in which at least three Y's are hydrogen and each of the other 3 Y's is selected from the group consisting of methyl and hydrogen. Thus, the formula embraces the following compounds: triethylenediamine; 2-methyl triethylenediamine; 2,3-dimethyl triethylenediamine; 2,5-dimethyl triethylenediamine; 2,6-dimethyl triethylenediamine; 3,5,7-trimethyl triethylenediamine; 2,5,7-trimethyl triethylenediamine; and 2,3,5-trimethyl triethylenediamine. The compound 1,4-diazabicyclo(2.2.2)octane is conveniently called triethylenediamine. The term "triethylenediamine type of compounds" is sometimes employed to designate compounds within said formula. A unique synergistic effect in the catalysis of the reaction mixtures is achieved in the present invention, whereby it is possible to achieve satisfactory stretchable articles at conditions sufficiently mild to be of commercial value.

The general method of making a polyurethane article by the casting technique can be described by the steps of: preparing a reaction mixture; pouring said reaction mixture into a mold in which the reaction mixture is transformed into an article. The residual reactive groups are subjected to polymerization conditions more severe than prevalent at the time of pouring the reaction mixture into the mold. The first stage of polymerization is designated as a curing operation, and the final stage is designated as a stabilizing treatment. After the article has been fully stabilized, the normal use conditions will not bring about adverse increases in polymerization. The stabilizing treatment may be a prolongation of the curing treatment, or different conditions may be employed. The more severe polymerization conditions required for curing and/or stabilizing is generally provided by a higher temperature. The reaction mixture desirably comprises a mixture of diols, an organic diisocyanate and catalytic amounts of the synergistic combination of a $C_2$–$C_5$ epoxy alkane and a triethylenediamine type of compound.

In some embodiments of the invention, the diol mixture desirably consists of two diols, at least one of the diols being polyalkyleneetherglycol within the molecular weight range from 400 to 4000. Polyalkyleneetherglycols are sometimes designated by formulas such as:

$$HO(CR_2)_y[O(CR_2)_y]_nO(CR_2)_yOH$$

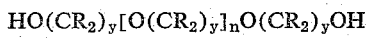

in which $n$ is from about 4 to 88, $y$ is from 2 to 4, and each R is either methyl or hydrogen. The polyalkleneetherglycols having a molecular weight in the 400–4000 range are polymers in which the ether units generally are ethylene, propylene, tetramethylene and mixtures thereof. Polyalkyleneetherglycols having a medium molecular weight of more than 400 but less than 950 are sometimes distinguished from the more volatile polyalkyeneetherglycols (M.W. 106–399) such as diethyleneetherglycol (M.W. 106) and from the more viscous ether glycols of the 1050–4000 M.W. range.

In certain embodiments, the diol mixture contains a concentration of 400–950 M.W. diol sufficient significantly to reduce the viscosity of the diol mixture to a consistency permitting rapid mixing and a concentration of 1050–4000 M.W. diol sufficient to decrease the demand for the relatively expensive diisocyanate. Each of the diols (i.e., the 400–950 M.W. diol and the 1050–4000 M.W. diol) may be present in a concentration within the range from 25 to 75% of such diol mixtures. All the materials characterized primarily as contributing hydroxy groups to the reactive mixture are generically described as the hydroxy component of the composition.

In certain embodiments of the invention, the organic diisocyanate is desirably an aromatic diisocyanate in a quantity providing a ratio of —NCO to —OH groups greater than 1.05 to 1 and less than 4 to 1. The specific catalyst composition must include the combination of a triethylenediamine type compound and a $C_2$–$C_5$ epoxy alkane, said catalyst composition providing for each 100 grams of hydroxy component from 0.01 to 8 grams of a triethylenediamine type of compound and from 0.02 to 10 grams of $C_2$–$C_5$ epoxy alkane, the molar quantity of epoxy alkane being at least twice the molar quantity of the triethylenediamine type of compound. Altho said synergistic combination in a catalyst composition is primarily emphasized, it should be noted that certain embodiments of reactive mixture may include very small proportions of supplemental catalyst components such as active tin soaps or organo-tin compounds, for example, stannous octoate or dibutyltin dilaurate. The quantity of tin compound employed, if any, is generally within the range from about 5 to about 25% of the triethylenediamine type of compound.

One example of a tetramethyleneetherglycol has an average molecular weight of 1500. One example of a propyleneetherglycol has an average molecular weight of 425. An appropriate mixture of said two diols consists of 31% tetramethyleneetherglycol (1500 M.W.) and 69% propyleneetherglycol (425 M.W.), thus providing a low viscosity mixture with an average molecular weight of 759.

Any of a great variety of aromatic diisocyanates may be employed, but tolylene diisocyanate is often preferred by reason of its low cost per pound mol. Among the other appropriate aromatic diisocyanates are 4,4'-diisocyanato diphenyl methane, 1,5-diisocyanato naphthalene, and 4,4'-diisocyanato dixylyl methane.

The class of $C_2$–$C_5$ epoxy alkane compounds includes ethylene oxide, propylene oxide, 1,2-epoxy butane (marketed as butylene oxide), and 2,3-epoxy butane. Epoxy pentane and epoxy isopentane are terms embracing the isomers of $C_5$ epoxy alkanes. It should be noted that ethers such as dioxane are not epoxy alkanes.

The nature of the invention is further clarified by reference to examples.

EXAMPLE I

A mixture of catalyst and diol was prepared consisting of the following:

|   | G. |
|---|---|
| 1500 M.W. polytetramethyleneetherglycol | 62.5 |
| 425 M.W. polypropyleneetherglycol | 28.2 |
| 1,2-epoxy butane | 1.7 |
| 1,4-diazabicyclo(2.2.2)-octane | 0.3 |
| Stannous octoate | 0.03 |

During approximately 30 seconds, 60.9 g. of tolylene diisocyanates were intimately mixed with the dry mixture of polyalkyleneetherglycol and catalyst to provide 153.6 g. of reaction mixture. The reaction mixture was degassed for about two minutes at an absolute pressure of about 5 millimeters of mercury. Most of the 1,2 epoxy butane and traces of moisture were removed from the mixture by such degassing. The degassed reaction mixture was poured into a mold for making a sheet of rubber. After the sheet had been heated for 35 minutes at 105° C., it was removed from the mold.

The removed sheet was heated at 105° C. for an additional 21 hours to provide an article having an advantageous combination of abrasion resistance and resilience. A test sample was cut from the sheet and found to be sufficiently stretchable to provide 100% elongation. The sheet had greater abrasion resistance than a commercially available rubber sheet with which it was compared.

The tensile strength was 5000 p.s.i.g. or 352 kg./cm.² The Shore D hardness was 72–73. Small manufacturers benefit from the simplicity of the technique consisting essentially of casting such a composition into a mold to prepare a polyurethane article having the advantageous combination of resilience, good resistance to abrasion and a tensile strength greater than 300 kg./cm.²

EXAMPLE II

A mold for a shoe heel is filled with the liquid reaction mixture prepared by adding 60.9 g. of tolylene diisocyanate to a mixture of diols, said reaction mixture consisting of:

| Tolylene diisocyanate | 60.9 |
|---|---|
| 1500 M.W. polytetramethyleneetherglycol | 62.5 |
| 425 M.W. polypropyleneetherglycol | 28.2 |
| 1,2-epoxy butane | 1.7 |
| 2-methyl-1,4-diazabicyclo-(2.2.2)-octane | 0.4 |

The stirred reaction mixture is degassed at 5 mm. Hg absolute pressure for 2 minutes, poured into the shoe heel mold, cured by heat in the mold for 35 minutes at 105° C., and then removed from the mold. The shoe heel is stabilized by heating at 105° C. for an additional 21 hours. The shoe heel is more abrasion resistant than a commercially available rubber shoe heel with which it is compared. The tensile strength of the polyurethane heel is greater than 300 kg./cm.²

EXAMPLE III

A series of shoe heels are prepared following the procedure of Example II but varying as single variables such features as the curing time, stabilizing time, stabilizing temperature, degassing pressure, and related processing variables, as well as formulation features such as the —NCO to —OH ratio, molecular weight of one or more diol components, molecular weight of the epoxy alkane, and the ratio of triethylenediamine type of compound to hydroxy component. It thus is established that shoe heels having highly desirable tensile strength and other highly desirable properties are expediently and conveniently produced only if there is compliance with the following requirements.

The reaction mixture must contain:

(a) An alkylenepolyetherglycol having an average molecular weight within the range from 1050 to 4000, and an alkylenepolyetherglycol having an average molecular weight within the range from 400 to 950, each of the polyetherglycols being present in a concentration within the range from 25% to 75% of the mixture thereof, said mixture containing —OH groups;

(b) An aromatic diisocyanate having —NCO groups, the quantity of diisocyanate being sufficient to provide a ratio of —NCO to —OH groups within the range from 1.05 to 1 to 4 to 1;

(c) A triethylenediamine type of compound in a quantity within the range from 0.01 to 8 parts per 100 parts by weight of polyalkyleneetherglycol; and (d) An epoxy alkane having from 2 to 5 carbon atoms, the quantity of such epoxy alkane being within the range from 0.2 to 10 parts per 100 parts by weight of polyalkyleneetherglycol and the quantity of epoxy alkane being greater than the quantity of triethylenediamine type of compound;

and the reaction mixture must be heated at a severity equivalent to at least 30 mintues at at least 40° C., comprising at least two stages at a severity equivalent to at least 15 minutes at at least 40° C.

The general nature of some of the possible variables is suggested in the following table:

|   | C | D | E | F |
|---|---|---|---|---|
| Carbon atoms per polyether unit | 2 | 2 | 3 | 3 |
| M.W. of higher M.W. glycol | 4,000 | 4,000 | 1,500 | 2,000 |
| Concentration percent in glycol mix | 30 | 50 | 70 | 70 |
| Carbon atoms per polyether unit | 2 | 4 | 3 | 3 |
| M.W. of other glycol | 600 | 800 | 900 | 900 |
| Concentration percent in glycol mix | 70 | 50 | 30 | 30 |
| TDI, sufficient for —NCO/OH ratio | 1.6 | 2 | 3 | 1.05 |
| Triethylenediamine/100 glycol | 0.4 | 2 | 3 | 3 |
| Carbon atoms in epoxy alkane | 2 | 5 | 4 | 3 |
| Epoxy alkane/100 glycol | 2 | 5 | 7.5 | 8 |
| Degassing, abs. pres. mm. Hg | 100 | 5 | 10 | 5 |
| Curing, ° C | 200 | 180 | 170 | 190 |
| Curing, minutes | 45 | 40 | 120 | 60 |
| Stabilizing, minutes | 300 | 600 | 600 | 600 |
| Stabilizing, ° C | 175 | 180 | 200 | 200 |

Moreover, good abrasion resistance is also a characteristic of the high tensile strength resilient shoe heels C, D, E, and F.

EXAMPLE IV

Polypropyleneetherglycol having an average molecular weight of about 425, and corresponding to about heptapropyleneetherglycol is reacted with tolylene diisocyanate (5% excess) using a mixture of about 2.9 mols of propylene oxide per 1 mol of triethylene diamine as the catalyst. Just prior to use, the polypropyleneetherglycol is degassed and dried at 5 mm. pressure for 10 minutes, using dry ethyl ether as a moisture entraining agent. The reactive mixture consists of:

| | |
|---|---:|
| Polypropylene glycol | 100 |
| Tolylenediisocyanate | 41.0 |
| Triethylenediamine | 2.0 |
| Propylene oxide | 3.0 |
| Total | 146.00 |

The reactive mixture is poured into a mold preheated to 110° C., and maintained at about this temperature for 16 minutes, and the rubber sheet removed from the mold and cured for an additional 16 minutes at 110° C. The rubber sheet is sufficiently stretchable, abrasion resistant, and strong to be useful as an elastomer.

EXAMPLE V

Several samples of stretchable sheets were prepared using 100% excess tolylenediisocyanate and a diol mixture consisting of 37.5% polypropyleneetherglycol (M.W. 2025) and 62.5% polypropyleneetherglycol (M.W. 425) and a catalyst mixture in which the molar ratio of 1,2-epoxy butane to triethylene diamine initially (prior to degassing) was 10.4 to 1. The epoxy butane was dissolved in one portion of the polyetherglycol, and the triethylenediamine in another portion, and the two were mixed for a controlled time prior to the addition of 58.5 g. of tolylenediisocyanate per 100 g. of the polypropyleneetherglycol mixture. The reactive mixture was poured into sheet molds, cured at 105° C. for 30 minutes, removed from the molds, and stabilized at 105° C. for 2 hours. The data thus obtained are tabulated:

Table

| Sample | TED, g. | Mix, min. | Cure, hrs. | Tens. str., kg./cm² | Shore D hardness | Percent elong. at break |
|---|---|---|---|---|---|---|
| A | 0.25 | 0.25 | | 155–189 | 65–68 | 75–100 |
| B | 0.25 | 1,440 | | 203–210 | 65–67 | 75–87 |
| C | 0.50 | 6 | | 188 | 69 | 106 |
| D | 0.50 | 285 | | (¹) | (¹) | (¹) |
| E | 0.25 | 19 | 3.67 | 127–169 | 67 | 50–100 |
| F | 0.25 | 19 | 18.8 | 143–160 | 58 | 123–168 |
| G | 0.25 | 60 | 3.67 | 162–168 | 66 | 88–100 |
| H | 0.25 | 60 | 18.8 | 210–250 | 61 | 163–178 |
| J | 0.25 | 117 | 3.67 | 141–179 | 65 | 79–86 |
| K | 0.25 | 117 | 18.8 | 176–252 | 63 | 171–180 |
| L | 0.25 | 145 | 3.67 | 134–165 | 64 | 71–76 |
| M | 0.25 | 145 | 18.8 | 146–281 | 62 | 145–173 |

¹ Gelled before casting.

By a series of such tests it is established that the epoxy alkane compound desirably interacts with the triethylenediamine type of compound for more than 15 seconds to form a cocatalyst prior to admixture with diisocyanate. The thus formed cocatalyst has a shelf life of at least 24 hours.

EXAMPLE VI

Several samples of rubber sheet were prepared using the previously discussed diol mixture (62.5% polypropyleneetherglycol M.W. 425 and 37.5% polypropyleneetherglycol M.W. 2025) 10.4 mols of butylene oxide per mol of triethylenediamine (0.5 part of TED per 100 parts of polypropyleneetherglycol) and varying the amount of excess tolylenediisocyanate. The results which were obtained are tabulated:

Table

| Sample | Percent excess TDI | Tensile strength, kg./cm² | Shore A hardness | Percent elongation |
|---|---|---|---|---|
| A | 92 | 94–119 | 91 | 75–125 |
| B | 59 | 65 | 82 | 125 |
| C | 46 | 34–44 | 72 | 119 |
| D | 30 | 33–40 | 65 | 163 |
| E | 20 | 29 | 54 | 212 |
| F | 8 | 20–22 | 44 | 433 |

Products having a Shore A hardness such as 44 are sometimes used as soft rubber coatings on rollers, for which purpose a tensile strength such as 20 kg./cm.² is acceptable.

EXAMPLE VII

A rubber sheet sample was prepared employing polypropyleneetherglycol, M.W. 425, as the diol. The epoxy butane initially was 3.32% of the polypropyleneetherglycol, but the excess was removed during the degassing of the composition. The molar ratio of epoxy butane to triethylenediamine after such degassing was consistently greater than 2. A formulation having an NCO/OH ratio of 1.16 was as follows:

| | |
|---|---:|
| Polypropyleneetherglycol (M.W. 425) | 100 |
| Tolylenediisocyanate | 47.5 |
| Triethylenediamine | 0.083 |
| 2,3-epoxy butane | 3.32 |

After curing and stabilizing, the rubber sheet had a Shore A hardness of 81, a tensile strength of 115 kg./cm.² and an elongation of 200%.

EXAMPLE VIII

Several rubber sheets were prepared using features of the previous example, including the combination of polypropyleneetherglycol (M.W. 425) and tolylenediisocyanate promoted by the complex of 1,2-epoxy butane and triethylenediamine. The —NCO/—OH ratio was varied in this series of tests:

Table

| Sample | TED, percent | —NCO/—OH | Tensile strength, kg./cm.² | Shore A hardness | Percent elongation |
|---|---|---|---|---|---|
| A | 0.083 | 1.10 | 74 | 76 | 200 |
| B | 0.083 | 1.19 | 155 | 98 | 150 |
| C | 0.083 | 1.15 | 134 | 88 | 200 |
| D | 0.25 | 1.15 | 200 | 90 | 180 |
| E | 0.25 | 1.20 | 208 | 96 | 184 |
| F | 0.083 | 1.20 | 154 | 98 | 150 |

Factors tending to decrease elongation, increase hardness and/or increase tensile strength, included increased isocyanate ratio and increased catalyst concentration within the ranges of such tests.

EXAMPLE IX

Casting of polyurethane elastomers in accordance with the present invention requires the use of a unit ratio (that is, $n:1$ of —NCO groups to —OH groups) of at least 1.05 and desirably in the 1.10 to 1.20 range but less than 4.00. The hydroxy component is desirably an alkylenepolyetherglycol having a molecular weight within the range from 400 to 4000. The alkylenepolyetherglycols should be selected from among polyethyleneetherglycol, polypropyleneetherglycol, polytetramethyleneetherglycol and copolymers and mixtures thereof. Of importance, the catalyst must contain at least about 2 mols but less than about 80 mols of an epoxy alkane having 2 to 5 carbon atoms per mol of triethylenediamine type of compound. The concentration of the triethylenediamine type of compound should be within the range from 0.01% to 8% of the alkylenepolyetherglycol, desirably about 0.5%. The concentration of the epoxy alkane should be within the range from 0.02 to 10% of the diol.

The method of preparing articles includes the steps of preparing a reactive mixture, pouring the reactive mixture into a mold, maintaining the reactive mixture at a severity of conditions equivalent to not less than a temperature of at least 40° C. for at least 15 minutes and stabilizing the article by an additional treatment also equivalent to at least 40° C. for at least 15 minutes. The article is cooled from such stabilizing treatment and is ready for use as a stretchable article.

EXAMPLE X

A rubber sheet was prepared by melting 2 g. of 4,4'-diamino, 3,3'-dichlorodiphenylmethane (methylene ortho chloro aniline) and dissolving in 100 g. of dehydrated polypropyleneetherglycol (425 M.W.), adding an aged mixture of 4 g. of 1,2-epoxy butane and 0.083 g. triethylenediamine, degassing for about an hour to remove water and excess epoxy butane, adding 50 g. of tolylenediisocyanate, and again, degassing for about a minute, and pouring the reactive mixture into a mold, in which it was cured and stabilized at 40° C. for 8 hours. The properties were as follows:

Tensile strength _____ kg./cm.$^2$ __ 242
Shore D hardness _____ 54
Percent elongation at break _____ 250

When the sheet was subjected to the Taber abrasion test, in which an abrasive wheel was weighted and rubbed against the sheet for a measured number of revolutions, and the loss of weight of the sheet was measured, the sheet showed acceptable resistance to abrasion, expressed as $13.9 \times 10^{-5}$ g./cycle.

By a series of tests, it is established that the general method of the present invention is advantageous when the principal catalyst is the combination of a $C_2$–$C_5$ epoxy alkane (even when a minor amount of supplemental catalyst is employed) when the principal reactive hydrogen component is a 400–4000 M.W. polyalkyleneetherglycol (even when a minor amount of amine supplements the glycol) and when the organic polyisocyanate is initially an aromatic diisocyanate (even when triisocyanates and other polyisocyanates form by cyclization reactions).

Obviously many modifications and variations of the invention as hereinbefore set forth may be made without departing from the spirit and scope thereof, and therefore only such limitations should be imposed as are indicated in the appended claims.

What is claimed is:

1. The method of preparing a nonporous, solid, stretchable article which consists essentially of the steps of: preparing a reactive mixture consisting essentially of at least one polyalkyleneetherglycol having a molecular weight within the range from 400 to 4000, an organic diisocyanate, and a cocatalyst consisting of epoxy alkane having from 2 to 5 carbon atoms, together with an amine compound of the formula

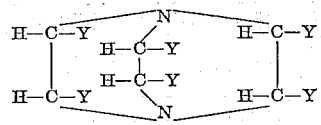

3 Y's of those present being selected from the group consisting of methyl and hydrogen, all other Y's being hydrogen, said epoxy alkane being present in a molar concentration at least twice the molar concentration of the amine compound; pouring said reaction mixture into a mold in which the reaction mixture is transformed into an article; curing the article at a temperature within range from about 40° C. to about 200° C. for from about 40 to about 120 minutes; removing the article from the mold; and stabilizing the article by heating it to a temperature within the range from about 40 to about 200° C. for from about 0.25 to 21 hours and cooling the stabilized article.

2. The method of claim 1 in which the organic diisocyanate is an arylenediisocyanate.

3. The method of claim 2 in which the arylenediisocyanate is tolylenediisocyanate.

4. The method of claim 1 in which each of the polyetherglycols is selected from the group consisting of polyethyleneetherglycol, polypropyleneetherglycol, polytetramethyleneetherglycol, and mixtures thereof.

5. The method of claim 1 in which the unit ratio of —NCO to —OH groups in the reactive mixture is within the range from 1.05:1 to 4:1.

6. The method of claim 1 in which the quantity of amine compound present in the reaction mixture is within the range from 0.01% to 8% of the polyalkyleneetherglycol.

References Cited by the Examiner

UNITED STATES PATENTS

| | | | |
|---|---|---|---|
| 2,979,485 | 4/61 | Burkus | 260—77.5 |
| 3,010,963 | 11/61 | Erner | 260—77.5 |
| 3,042,632 | 7/62 | Erner | 260—77.5 |

FOREIGN PATENTS 733,624   11/62   Great Britain.

LEON J. BERCOVITZ, *Primary Examiner.*